United States Patent
Taussig et al.

(10) Patent No.: US 6,181,050 B1
(45) Date of Patent: *Jan. 30, 2001

(54) ELECTROSTATIC MICROMOTOR WITH LARGE IN-PLANE FORCE AND NO OUT-OF-PLANE FORCE

(75) Inventors: Carl P. Taussig, Redwood City; Richard E. Elder, Palo Alto, both of CA (US)

(73) Assignee: Hewlett Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/958,635

(22) Filed: Oct. 27, 1997

(51) Int. Cl.[7] ........................................ H02N 1/00
(52) U.S. Cl. ................................. 310/309; 318/116
(58) Field of Search ...................... 310/309; 318/116; 74/5, 6 D

(56) References Cited

U.S. PATENT DOCUMENTS

| | | | |
|---|---|---|---|
| 3,785,709 | * 1/1974 | Atkinson | 308/10 |
| 3,954,024 | * 5/1976 | Staats | 74/5.41 |
| 4,061,043 | * 12/1977 | Stiles | 74/5.6 D |
| 5,477,097 | 12/1995 | Matsumoto | 310/309 |
| 5,534,740 | * 7/1996 | Higuchi et al. | 310/309 |
| 5,986,381 | * 11/1999 | Hoen et al. | 310/309 |

FOREIGN PATENT DOCUMENTS

2211078 * 8/1990 (JP) ................................. 310/309

OTHER PUBLICATIONS

Translation of Japanese Patent Application 5–22,960, Jan. 1993.*
European Search Report, Application No.: EP 98 30 8766, dated Feb. 15, 2000.

* cited by examiner

Primary Examiner—Karl Tamai

(57) ABSTRACT

An electrostatic actuator having two-dimensional in-plane motion of a monolithic element suspended by flexures which is unstable in the open-loop and uses feedback control to operate. By adding a common bias voltage to each of the stator electrodes when the translator and stator are in the unstable equilibrium position, repulsion can be reduced to zero while the in-plane force remains in unstable equilibrium. Stabilizing the in-plane force at the unstable equilibrium position is achieved by shifting the electrical phase of the stator potential distribution in a direction to produce an in-plane force which opposes motion of the translators away from the equilibrium position. Linear control and pulse width modulation control permit altering the phase by less than the stator pitch. The drive electrodes of the translator and stator are used as position sensors for in-plane and out-of-plane relative displacements of the translator and stator concurrent with operation of the motor using either pulse-width modulation or linear control.

4 Claims, 2 Drawing Sheets

SECTION 3-3

SECTION 4-4 though the previous invention has some clear advantages over prior art, further improvements are desirable.

ELECTROSTATIC MICROMOTOR WITH LARGE IN-PLANE FORCE AND NO OUT-OF-PLANE FORCE

FIELD OF THE INVENTION

The invention relates generally to electrostatic actuators and more particularly to micromachined electrostatic actuators.

BACKGROUND OF THE INVENTION

With the advent of micromachining techniques, there has been renewed interest in electrostatic actuators sometimes called "micromotors". Electrostatic actuators achieve high energy densities and can be manufactured using straightforward manufacturing techniques. Electrostatic actuators have been used to position optical devices, to operate switches, and to turn small gears. For advanced data storage devices and other applications, micromachined actuators that have a large travel, whose positioning can be controlled with great precision, and that operate in response to a low actuation voltage are needed. These requirements are not met by known micromachined electrostatic actuators.

A micromachined electrostatic actuator that satisfies some of the above requirements is described by Trimmer and Gabriel in *Design Considerations for a Practical Electrostatic Micro-Motor*, SENSORS AND ACTUATORS, Vol. 11, pages 189–206 (1987) and in U.S. Pat. No. 4,754,185. These documents describe an electrostatic actuator in which a grounded moveable silicon substrate or "rotor" (sometimes called a "translator") is moved relative to a fixed silicon substrate or "stator." The stator has several sets of electrodes on its surface, one of which is held at a voltage different from ground in order to position the rotor. Stepped motion is provided by setting the pitches of the stator and rotor electrodes in a vernier relationship. The rotor electrodes all having the same voltage, i.e., ground potential, significantly eases fabrication of the device.

However, the electrostatic actuator described by Timmer and Gabriel does not meet all of the requirements set forth above. For example, an actuation voltage of approximately 100 V is required to exert a force on the rotor in the direction parallel to the plane of the rotor surface (an "in-plane force") in the range of forces required to operate an advanced memory device. This actuation voltage is outside the range of voltages that can be controlled using CMOS integrated circuits. Moreover, the in-plane force is accompanied by an out-of-plane force perpendicular to the plane of the rotor. The out-of-plane force attracts the rotor towards the stator and is as much as ten times greater than the in-plane force.

The large attractive out-of-plane force places significant constraints on the suspension used to maintain the spacing between the rotor and stator. For conventional-size electrostatic actuators, spacers, bearings and lubricating layers may be used to support the rotor against the attractive force. However, for micro-scale structures, it is more difficult to provide an effective way of maintaining the spacing between the rotor and stator without large frictional forces that adversely affect operation.

Folded beam flexures are most commonly used in micromachined devices to support the rotor above the stator. Advanced data storage applications require actuators that can travel 25 μm laterally while maintaining the rotor-stator spacing to an accuracy of 0.1 μm. If the ratio of the out-of-plane force to the in-plane force is near 10, as in the electrostatic actuator described by Timmer and Gabriel, then a 2 μm-wide beam flexure would need to be at least 100 μm tall to have sufficient out-of-plane stiffness. Such a structure is extremely difficult to fabricate using conventional processing.

A first approach to mitigate the effects of the out-of-plane attractive forces in micromachined devices is to use two stationary electrode plates on opposite sides of a movable plate. By selecting the appropriate electrode configuration, it is possible to levitate the moving plate at a relatively stable position between the two stationary plates. However, this approach requires exacting process control during fabrication and/or assembly.

A second known approach applicable to micromachined devices is to use the weight of the movable substrate to counteract the attractive force. However, since this approach does not work if the electrostatic actuator is tilted, its usefulness is significantly restricted.

In both of the approaches discussed above, the rotor electrodes are all held at a single voltage. Macro-scale electrostatic actuators are known that have three or more voltages present on both the stator and rotor. One approach using a three-phase oscillating voltage pattern is described in U.S. Pat. No. 5,534,740 of Higuchi et al. This approach can produce a very large in-plane force. However, the large in-plane force is accompanied by a large out-of-plane force about four times greater than the in-plane force. Oscillating voltages of approximately 200 volts are required to generate an in-plane force of sufficient magnitude to overcome friction in the suspension elements. Therefore, this approach will not conveniently scale to a micromachined device because of the large out-of-plane force and the requirement to connect three oscillating voltages to the rotor electrodes. Making electrical connections to a moveable rotor is difficult, particularly for a micromachined rotor, so it is desirable to minimize the number of voltages present on the rotor electrodes. In addition, the way in which the voltages vary with time should be made as simple as possible.

Some conventional electrostatic actuators provide precise position control and a large range of travel, but cannot simply be scaled for use in micromachined electrostatic actuators. This is because these actuators operate with actuation voltages greater than those that can be controlled using CMOS integrated circuits, generate an out-of-plane force that is too large relative to the in-plane force, and require too many electrical connections to be made to the rotor.

What is needed is an electrostatic actuator and a way of controlling an electrostatic actuator that provides precise positioning and that can be controlled using CMOS integrated circuits. What is also needed is such an electrostatic actuator that can be fabricated using micromachining techniques that employ processing similar to that used to make integrated circuits.

U.S. patent application 08/818,209, filed Mar. 14, 1997, entitled "Electrostatic Actuator With Alternating Voltage Patterns", having inventors Storrs Hoen and Carl Taussig, (hereafter referred to as the "previous invention") which is incorporated by reference (but is unpublished at the filing of the instant patent application), describes an electrostatic actuator, hereinbefore unknown in the art, that partially satisfies these needs. An alternating voltage pattern is imposed on electrodes located on opposed electrode surfaces of both the rotor and the stator. The actuator provides a significantly lower out-of-plane force for a given in-plane force. The actuator will provide an in-plane force in the range of forces required in an advanced memory device when driven with actuation voltages in the range that can be controlled using CMOS integrated circuits. The actuator can be manufactured using micromachining techniques that employ processing similar to that used to make integrated circuits.

The electrostatic actuator includes a stator having a first linear array of electrodes disposed along an opposed surface and a rotor having a second linear array of electrodes disposed along an opposed surface opposite the opposed surface of the stator. The opposed surfaces of the stator and rotor are spaced apart by a spacing d. The rotor is supported relative to the stator to allow the rotor to move in the in-plane direction, parallel to the opposed surfaces. Initially, an alternating voltage pattern is imposed on the electrodes on both the rotor and stator. For example, a first voltage level is applied to every other electrode in each array, and a second voltage level, different from the first voltage level, is applied to each electrode adjacent the electrodes at the first voltage level. By introducing a local disruption into the alternating voltage pattern on the stator, the rotor can be moved in the in-plane direction by a precise distance.

The alternating voltage patterns will not by themselves reduce the out-of-plane attractive force to a level comparable with the large in-plane force. To reduce the out-of-plane force for a given in-plane force, the pitch/spacing ratio p/d, which is the ratio between the electrode pitch p of the rotor and the spacing d between the opposed surfaces of the rotor and the stator must be within an optimal range. A usably low out-of-plane force results when the pitch/spacing ratio is less than eight. The out-of-plane force is minimized for a given in-plane force when the pitch/spacing ratio is less than about 2.25.

In a preferred embodiment, in-plane motion is provided by a stepper driven array of electrodes located on the opposed surface of the rotor and a corresponding stepper drive array of electrodes located on the opposed surface of the stator. Each driven array has an even number $n_r$ of rotor electrodes and each drive array has an odd number $n_s$, of stator electrodes, so that $n_s = n_r \pm 1$. The ratio of the pitch of the driven electrodes to the pitch of the stator electrodes is $n_s/n_r$.

The drive electrodes may alternatively be located on the rotor, in which case, the driven electrodes are located on the stator. In this case, each driven array has an even number of stator electrodes and each drive array has an odd number of rotor electrodes, differing in number from the number of stator electrodes by one. The ratio of the pitch of the driven electrodes to the pitch of the stator electrodes is equal to the ratio of the number of rotor electrodes and the number of stator electrodes.

As described above, an alternating voltage pattern initially exists on the electrode arrays located on each of the stator and the rotor. The alternating voltage pattern on the stator alternates between the first voltage and the second voltage, where the first voltage is applied to the first electrode in the stator array. In-plane movement of the rotor is induced by locally disrupting the initial alternating voltage pattern by switching the voltage on the first electrode from the first voltage to the second voltage. Further in-plane movement may be induced by switching the second stator electrode to the first voltage, leaving the voltage on the first electrode unchanged at the second voltage.

The mode of operation just described subjects the rotor to an attractive force directed toward the stator. However, unlike the case in which all the rotor electrodes are held at the same voltage, the magnitude of the out-of-plane attractive force can be reduced by a factor of approximately ten to a level approximately equal to the maximum in-plane force applied to the rotor. If the rotor is suspended by beam flexures, this reduction in the out-of-plane force by a factor of ten reduces the aspect ratio of the beam flexures to one that can be easily manufactured by conventional techniques.

A further advantage of the electrostatic actuator according to this previous invention is that it provides a large in-plane force for a given actuation voltage. The in-plane force may be as large as one third of the attractive force between the two plates of an equivalently-sized parallel-plate capacitor.

The electrostatic actuator according to this previous invention has another advantage in that the in-plane position of the rotor can be progressively stepped without changing the alternating voltage pattern imposed on the rotor electrodes. As a result, the stepping rate is not limited by the dynamic electrical characteristics of the rotor. Moreover, only one stator electrode in each set of stator electrodes need be switched at any one time to step the rotor position. This imposes a minimum of timing constraints on the stator voltage control circuitry.

The electrostatic actuator according to this previous invention can be used to provide displacements in both the in-plane and out-of-plane directions, i.e., in directions respectively parallel and perpendicular to the opposed surfaces of the stator and rotor. Opposed electrodes on which an alternating voltage pattern is imposed can also be used to exert an out-of-plane force on the rotor. Such out-of-plane force can be used to offset the out-of-plane attractive force exerted on the rotor by the electrodes generating the in-plane force. Additionally or alternatively, the out-of-plane force can be used to control the position of the rotor in the out-of-plane direction.

The out-of-plane force is preferably provided by an array of levitator drive electrodes located on the opposed surface of the stator and an array of levitator driven electrodes located on the opposed surface of the rotor. The arrays of levitator drive electrodes and levitator driven electrodes have equal pitch. The alternating voltage patterns are imposed so that levitator electrodes in the higher-voltage state on the rotor are aligned with the levitator electrodes in the higher voltage state on the stator. With this arrangement, the rotor is repelled from the stator. The out-of-plane force can be controlled by varying the voltages on either or both of the rotor or stator. The array of levitator drive electrodes may alternatively be located on the opposed surface of the rotor and the array of levitator driven electrodes may alternatively be located on the opposed surface of the stator.

Electrode arrays primarily generating an in-plane force ("stepper electrode arrays") and electrode arrays generating an out-of-plane force ("levitator electrode arrays") can be combined to provide additional functionality. For example, a number of similar electrode arrays can be used to increase the force applied by a single electrode array. Moreover, a first stepper electrode array disposed perpendicular to a second stepper electrode array can move the rotor in either or both of two perpendicular in-plane directions. A levitator electrode array disposed perpendicular to a stepper electrode array can be used to offset the attractive out-of-plane force generated by the stepper electrode array. Finally, parallel stepper electrode arrays with different pitches can be used to exert an in-plane force on the rotor without any associated out-of-plane force.

The out-of-plane force exerted by a stepper array may also be reduced by filling the space between the rotor and stator with solid or fluid dielectrics.

One half of the electrodes in the rotor array may be replaced by a conductive plane set to a predetermined voltage, such as ground potential. This conductive plane forms "effective" electrodes between adjacent physical electrodes. For example, a conductive plane may be formed, and may be covered by an insulating layer on which a linear array of electrically-interconnected physical electrodes is located. Each region of the conductive plane between adjacent physical electrodes functions as an effective electrode. The alternating voltage pattern is established by setting the electrically-interconnected physical electrodes to a voltage different from that of the conductive plane.

The drive electrodes in the stepper array are preferably connected to the same pair of voltage levels as the corresponding driven electrodes, although additional positioning accuracy can be provided if the electrode whose voltage is changed to disrupt the alternating voltage patten is connected to a voltage intermediate between the pair of voltage levels.

Because of the high voltage-to-in-plane-force conversion efficiency of the electrostatic actuator according to this previous invention, the pair of voltages applied to the electrodes to impose the alternating voltage pattern may be selected to provide compatibility with CMOS circuits. Voltage pairs differing by less than 20 V will provide rapid movement of the rotor over a 50 $\mu$m range.

Throughout this disclosure, the terms "rotor" and "translator" are used to describe the movable part of the actuator, irrespective of whether the moveable part actually moves, and irrespective of whether it moves laterally or rotates. The embodiments described below can be directly employed in both rotary and linear actuators. In rotary electrostatic actuators, the electrodes of the stepper arrays are deposed radially about the center of rotation, and the electrodes of the levitation arrays are concentric with the center of rotation.

Arrays of sense electrodes may additionally or alternatively be located on the opposed surfaces of both the rotor and the stator to generate electrical signals indicating the position of the rotor. Corresponding sense arrays on the rotor and the stator have equal pitch. An alternating voltage pattern is applied to the sensor drive array, which is preferably located on the rotor, the voltage pattern induced in the sensor driven array preferably located on the stator is detected, and the position of the rotor is determined from the voltage pattern.

As noted above, the driven role of the rotor may be interchanged with the driving role of the stator for the stepper and levitator electrodes, and the driving role of the rotor may be interchanged with the driven role of the stator for the sensor electrodes.

As mentioned above, a usably-low out-of-plane force is obtained when the pitch/spacing ratio, p/d, is less than eight, and the out-of-plane force for a given in-plane force is minimized when the pitch/spacing ratio is less than 2.25. When the pitch/spacing ratio is less than 2.25, the in-plane force is maximized and the attractive out-of-plane force is minimized for a given actuation voltage.

Because the alternating voltage pattern on the rotor does not need to change with time, the electrostatic actuator according to this previous invention will also operate when the alternating voltage pattern is established on the rotor opposed surface in some other way. For example, the alternating voltage pattern may be established by electrostatic charge deposited on the opposed surface, by a poled ferroelectric located on the opposed surface or by a strain field established in a piezoelectric material located on the opposed surface. To describe these alternatives, the relationship to maximize the in-plane force in terms of the spacing d can be stated in terms of the primary spatial wavelength $\lambda$ of the voltage distributions on the opposed surfaces of the rotor and the stator. This more analytic description is also necessary for an accurate description of the electrostatic actuator when the voltage pattern imposed on the electrodes is not exactly an alternating pattern, or when intermediate voltage levels are applied to some of the electrodes.

When the operation of the electrostatic actuator is described in terms of the primary spatial wavelength, the relationship to maximize the in-plane force in terms of the spacing d can be stated as a requirement that ratio of the primary spatial wavelength $\lambda$ to the spacing d, i.e., the spatial wavelength/spacing ratio, be less than 4.5. If the voltage pattern is strictly alternating and the pitch of the electrodes is uniform and equal top, the primary spatial wavelength is simply 2p, and the constraint on $\lambda$ is identical to the constraint on p. If the voltage pattern is not strictly alternating, such as occurs when the alternating voltage pattern on the stator is locally disrupted to change the position of the rotor, then the primary spatial wavelength $\lambda$ is determined by calculating a Fourier transform of the voltage distribution.

The primary advantage of the electrostatic actuator according to this previous invention is that a voltage compatible with CMOS circuits will generate an in-plane force sufficiently large to move the rotor relative to the stator over distances of several tens of microns, and that the out-of-plane force generated as a side effect of generating the in-plane force is small enough to allow conventionally-fabricated folded beam flexures to support the rotor. A second advantage is that only two voltages need to be connected to the rotor, which enables the rotor to be fabricated with a minimum number of electrical interconnects. Moreover, because the voltages on the rotor are static, these electrical interconnects can have a relatively high impedance. Simplified electrical interconnects reduce the process complexity and minimize the effects of residual mechanical strains resulting from the use of dissimilar materials.

Although the previous invention has advantage over the prior art in the areas of long travel, high force, and two-dimensional in-plane motion of a monolithic element suspended by flexures, it operates as a stepper motor. Moreover, there continues to be a need for increased in-plane stiffness for the same maximum in-plane force level, greater resolution for a given minimum lithographic feature size, and elimination of out-of-plane forces. Like the previous invention, such an electrostatic actuator and a way controlling such electrostatic actuator should provide precise positioning and be controlled using CMOS integrated circuits. Such an electrostatic actuator should be fabricated using micromachining techniques that employ processing similar to that used to make integrated circuits.

SUMMARY OF THE INVENTION

The above requirements are met by an electrostatic actuator having a structure that will be described in more detail below. This invention shares the advantages of long travel, high force, and two-dimensional in-plane motion of a monolithic element suspended by flexures with the previous invention of U.S. patent application Ser. No. 08/818,209. It differs from the previous invention in that it does not operate as a stepper motor. The current invention is unstable in the open-loop and uses feedback control to operate. Through the use of feedback control the following advantages are realized with respect to the previous invention: increased in-plane stiffness for the same maximum in-plane force level, greater resolution for a given minimum lithographic feature size, and elimination of out-of-plane forces. This last advantage is particularly important from the standpoint of fabrication. The virtual elimination of out-of-plane forces makes it possible to microfabricate using simple additive processes.

Mechanically the device is similar to that described above with respect to the previous invention. The length of the stator stripes exceeds that of the facing translator (or rotor) stripes and they are aligned so that the overlap between the facing stripes will remain equal to the length of the shorter stripe throughout in-plane parallel translation. Therefore, motion in the parallel in-plane direction will not affect the capacitance between the facing stripes and consequently the forces in the two directions perpendicular to the stripes will not change. The decoupling of the forces produced by the two orthogonal groups of stripes from orthogonal in-plane translation allows a single rigid element to be translated in two perpendicular directions. This results in a more compact micromotor with higher out-of-plane stiffness and more area available for traction producing features when compared with designs requiring nesting or stacking to achieve two-dimensional motion, e.g. two dimensional comb-drives.

The spatial frequency and amplitude of the stator potential functions are the same as their respective translator counterparts, however the spatial phase of the potential distribution can be shifted electrically. The spatial period of the stator potential divided by the pitch of the stator electrodes gives the number of stator electrical phases, n. Modulation of the voltages on the n stator electrical phases can be used to shift the spatial phase of the stator potential distribution.

As the spatial phase of the stator potential distribution is shifted from 0 degrees, relative to the translator distribution, to 180 degrees, the in-plane force between the translator and stator will pass through two equilibrium positions. At 0 degrees, the in-plane force is in an unstable equilibrium condition. At this point the out-of-plane force reaches a positive maximum (maximum out-of plane repulsion). At 180 degrees, there is a second equilibrium condition which occurs. The in-plane force is stable at this point and the out-of-plane force is at a negative maximum (maximum attraction).

By adding a common bias voltage to each of the stator electrodes when the translator and stator are in the unstable equilibrium position, the repulsion can be reduced to zero while the in-plane force remains in unstable equilibrium. Alternately, these bias voltages can be applied to the translator electrodes with the same effect.

Stabilizing the in-plane force at the unstable equilibrium position is achieved by shifting the electrical phase of the stator potential distribution in a direction to produce an in-plane force which opposes motion of the translators away from the equilibrium position. The phase of the stator potential distribution can be shifted by an amount equal to the pitch of the stator electrodes just by permuting the voltages applied to the n stator electrical phases with a modulo n shift of magnitude 1, i.e., assign to phase "I" the voltage currently applied to phase "I−1" (or "I+1" to shift in the other direction).

Two equally preferred techniques have been demonstrated for altering the phase by less than the stator pitch. The first technique is to linearly vary the voltage of each of the n stator electrical phases between its present value and the value currently applied to the subsequent (or preceding) electrode phase. The second technique is to time multiplex between the present electrode phase voltage and the voltage of an adjacent electrode phase with a duty-cycle proportional to the phase shift. The period of the time for a multiplex cycle is selected to be far shorter than the mechanical time constants of the micromotor. These methods will be referred to as linear control and pulse width modulation control and have been demonstrated experimentally.

Position information is very important to the operation of the servo. The drive electrodes of the translator and stator can be used as position sensors for in-plane and out-of-plane relative displacements of the translator and stator concurrent with operation of the motor using either pulse-width modulation or linear control. The approach is to superpose an AC excitation on top of the DC excitation supplied to the translator electrodes and, by sensing these signals with the stator electrodes, measure the phase-to-phase capacitance; and hence infer the displacement. The technique for measuring the in-plane position has the following characteristics: it does not interfere with the concurrent operation of the motor, it is immune to biases produced by changes in the amplitude of sensor drive signals, it provides both in-phase and quadrature signals for full four quadrant position sensing, and it is unaffected by changes in the translator-stator gap. In addition the same measurements can be processed in a different manner to provide a measurement of the translator-stator gap which is independent of the relative in-plane position of the translator and stator.

BRIEF DESCRIPTION OF THE DRAWINGS

FIG. 5 is a block diagram illustrating the feedback control mechanism of the present invention.

DETAILED DESCRIPTION OF THE INVENTION

Figure 1:
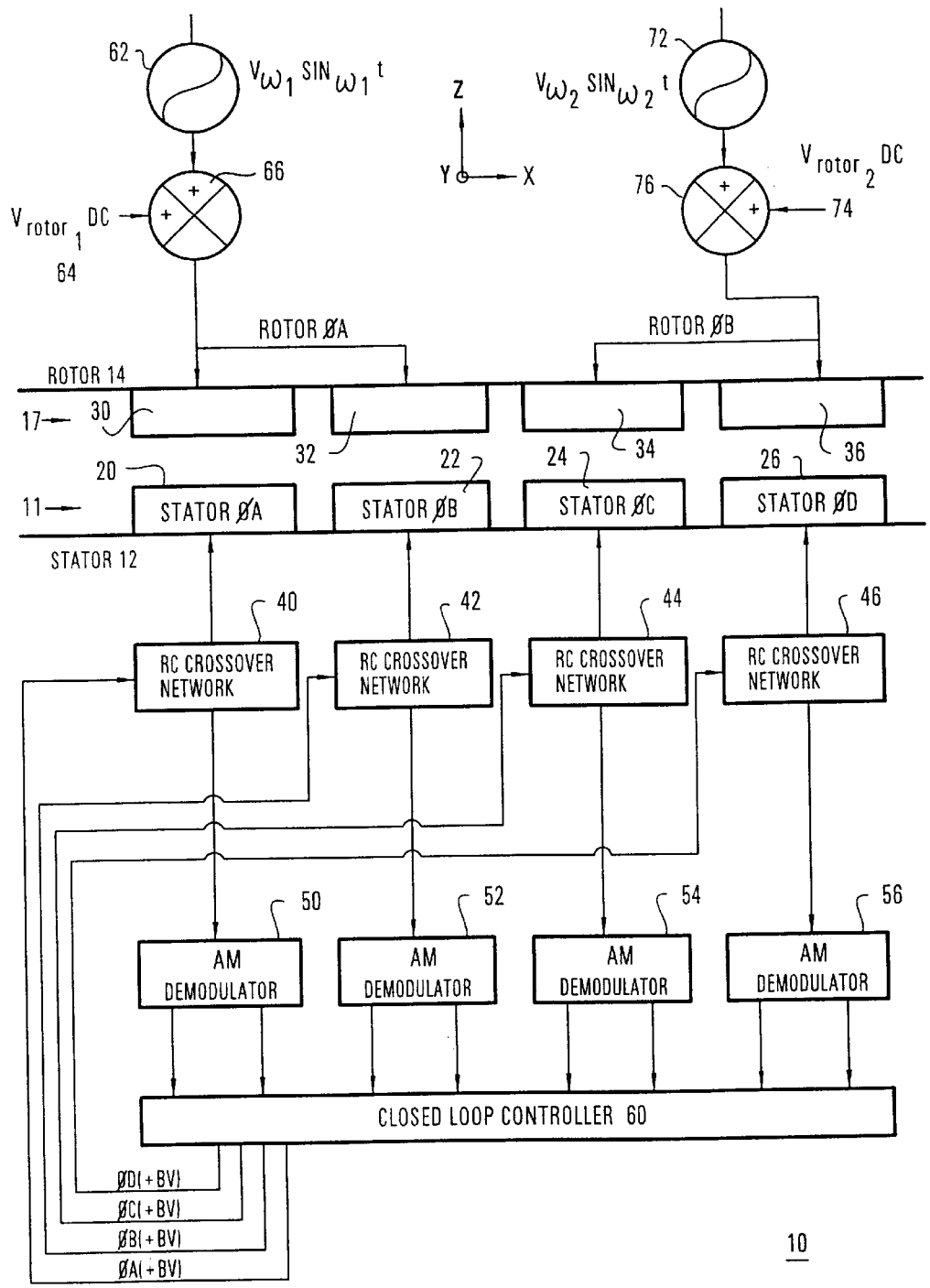
FIG. 1 is a schematic view of the basic embodiment of the electrostatic actuator according to the invention.

A basic embodiment of the electrostatic actuator 10 according to the invention is shown schematically in FIG. 1. The structure of this actuator is characteristic of the embodiments that will be described below. The electrostatic actuator includes the stator 12 and the rotor 14. The stator includes the plane opposed surface 13 along which the linear array 11 of stator electrodes 20, 22, 24 and 26 is disposed. The rotor includes the plane opposed surface 15 opposite the opposed surface 13 of the stator. Disposed along the opposed surface 15 is the linear array 17 of rotor electrodes 30, 32, 34 and 36. The stator electrodes and the rotor electrodes are each elongate in a plane perpendicular to the plane of the drawing.

Throughout the below description, the terms "actuator" and "micromotor" will be used interchangeably. Similarly, the terms "rotor" and "translator" will also be used interchangeably throughout the below description.

A small AC dither voltage 62, $V_{\omega 1} \sin \omega_1 t$, and a DC excitation voltage 64, $Vrotor_1$ DC, are combined 66 and applied to rotor electrodes 30 and 32. Similarly, a small AC dither voltage 72, $V_{\omega 2} \sin \omega_2 t$, and a DC excitation voltage 74, $Vrotor_2$ DC, are combined 76 and applied to rotor electrodes 34 and 36.

RC crossover networks 40, 42, 44 and 46 are coupled to stator electrodes 20, 22, 24 and 26, respectively. RC crossover networks 40, 42, 44 and 46 are also coupled to closed loop controller 60 through respective AM demodulators 50, 52, 54 and 56. In turn, to complete the feedback loop, closed loop controller 60 is coupled to RC crossover networks 40, 42, 44 and 46.

In this example, there are four stator phases; i.e., stator φA, stator φB, stator φC, and stator φD, associated with respective stator electrodes 20, 22, 24 and 26. Similarly, there are two rotor phases; i.e., rotor φA and rotor φB. Note, however, that rotor φA is associated with rotor electrodes 30 and 32 because rotor electrodes 30 and 32 are coupled together. Similarly, because rotor electrodes 34 and 36 are coupled together, rotor φB is associated with rotor electrodes 34 and 36.

Figure 2:
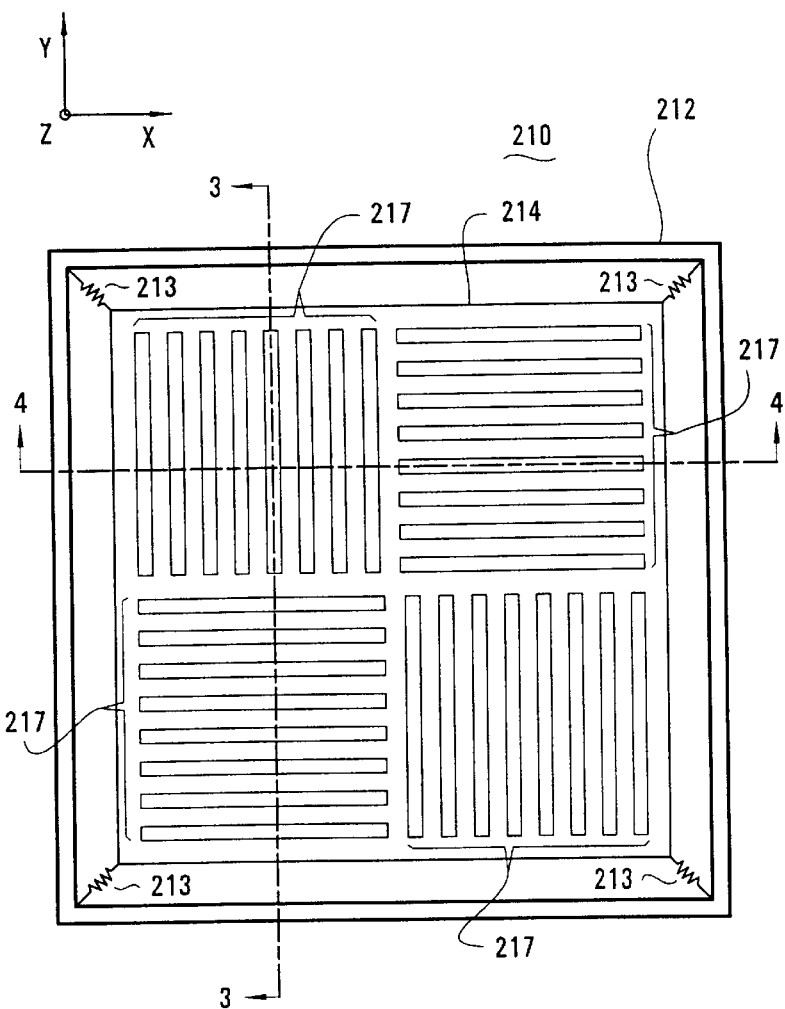
FIG. 2 is a top view of an embodiment of an electrostatic actuator shown in FIG. 1.
Figure 3:
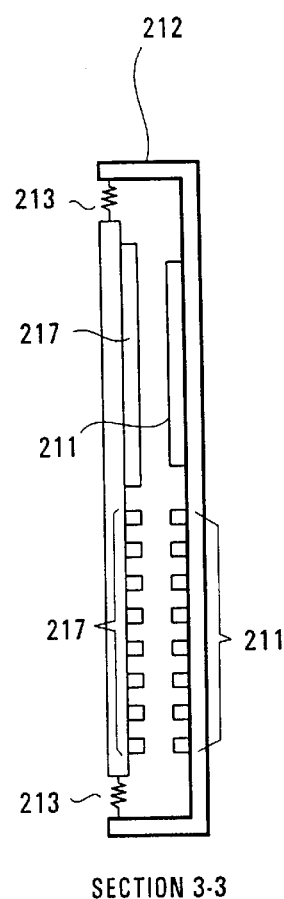
FIG. 3 is a section view along line 3—3 shown in FIG. 2.
Figure 4:
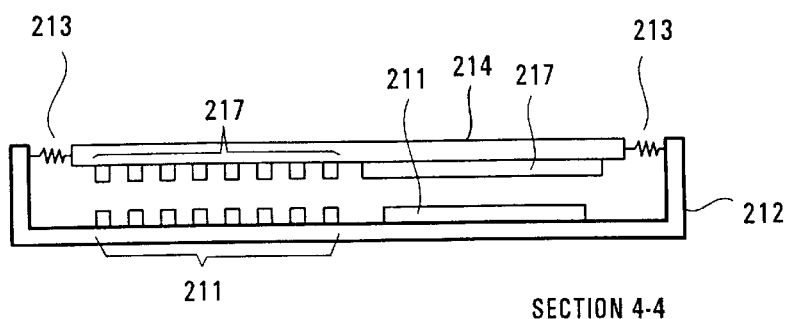
FIG. 4 is a section view along line 4—4 shown in FIG. 2.

The operation of the electrostatic actuator of FIG. 1 is best explained in conjunction with the embodiment of FIGS. 2–4. FIG. 2 is a top view of an embodiment of an electrostatic actuator shown in FIG. 1. FIG. 3 is a section view along line 3—3 shown in FIG. 2. Similarly, FIG. 4 is a section along line 4—4 shown in FIG. 2.

In FIG. 2 it can be seen that rotor 214 of electrostatic actuator 210 is suspended parallel to stator 212 by springs 213. Four rotor electrode arrays 217 are disposed on the surface of rotor 214 facing the surface of stator 212 that has four corresponding sets of stator electrode arrays. Note that the stator electrode arrays are not shown in FIG. 2, but are shown as stator electrode arrays 211 in FIGS. 3 and 4.

For this example, each of the rotor electrode arrays 217 includes eight individual rotor electrode strips and operates in the same manner as the four-electrode rotor array 17 of FIG. 1. The rotor electrode arrays 217 of FIG. 2 are oriented such that each array 217 is orthogonal to its non-diagonal neighbors.

Similarly, each of the stator electrode arrays 211 shown in FIGS. 3 and 4 includes eight individual stator electrode strips and operates in the same manner as the four-electrode stator array 12 of FIG. 1. The stator electrode arrays 211 are oriented such that each array 211 is orthogonal to its non-diagonal neighbors.

The preferred embodiment of the electrostatic actuator is formed by micromachining using conventional integrated circuit fabrication techniques. For example, the rotor and stator may have a semiconductor substrate on which patterned dielectric and conductive layers are formed. In one embodiment, a single-crystal silicon substrate was used with its surfaces protected by a layer of silicon nitride. A layer of tungsten was deposited on top of the silicon dioxide layer and was selectively etched to form the electrodes and conductors interconnecting the electrodes. The use of integrated circuit fabrication techniques to form micromachined electrostatic actuators is known in the art. Alternatively, the substrates of the rotor and stator may be formed of materials conventionally used to form printed circuit boards or flex circuits.

FIG. 2 has a schematic representation of springs 213 being used to suspended rotor 214 parallel to stator 212. However, the rotor can be supported over the stator in a number of different ways. As discussed above, a mechanical support using bending flexures such as folded beam flexures is preferred because such a structure supports the rotor with no appreciable static or dynamic friction. The negligible out-of-plane force achieved in the electrostatic actuator according to the invention enables folded beam flexures with relatively small aspect ratio to be used. Such folded beams flexures can be made relatively easily using conventional semiconductor fabrication techniques.

The rotor may be suspended above the stator in other ways. The rotor may be suspended by a fluid layer such as an air layer or dielectric liquid layer, by rolling bearings or other rolling contact, by sliding contact, by sliding contact where one member is ultrasonically vibrated to reduce friction, and by van der Waals repulsion between surfaces between which is disposed an appropriate dielectric fluid.

Hence, it can now be seen that this invention provides a method for the translation of parallel surfaces relative to each other in either of two orthogonal directions within a plane parallel to both surfaces without producing forces in the direction perpendicular to the surfaces. The forces to actuate the surfaces are produced by electrostatic fields which are generated by patterns of electrodes on the sides of the surfaces which face each other. The potentials applied to the electrodes are a function of the position of the patterns with respect to each other. These same electrode patterns are used to sense the relative position of the two surfaces via capacitive coupling of superposed AC potentials.

This invention shares the advantages of long travel, high force, and two-dimensional in-plane motion of a monolithic element suspended by flexures with the previous invention of U.S. patent application Ser. No. 08/818,209. It differs from the previous invention in that it does not operate as a stepper motor. The current invention is unstable in the open-loop and requires feedback control to operate.

FIG. 5 is a block diagram illustrating the feedback control mechanism of the present invention. As will be described below in greater detail, controller 500 applies control voltages to rotor electrodes 14 and stator electrodes 12 using position information feedback.

Through the use of feedback control the following advantages are realized with respect to the previous invention: increased in-plane stiffness for the same maximum in-plane force level, greater resolution for a given minimum lithographic feature size, and elimination of out-of-plane forces. This last advantage is particularly important from the standpoint of fabrication. Previous designs have had out-of-plane forces which were at least of the same magnitude as the in-plane forces, this combined with the desire to have large in-plane translations, while maintaining a nearly constant gap, forces the beams which comprise the suspension to have a large aspect-ratio (depth divided by width). This requirement restricts the possible fabrication techniques. In contrast, the virtual elimination of out-of-plane forces permits microfabrication using simple additive processes.

Mechanically the device is similar to that described above in summary, and in greater detail in the previous U.S. patent application Ser. No. 08/818,209. It consists of a stationary dielectric element with a planar surface on which a pattern of electrodes is deposited. This element is referred to as the stator. A second similar element is positioned with its pattern of electrodes facing those of the stator in a plane parallel to but offset by a gap from the plane containing the stator electrodes. This element is referred to as the translator (or sometimes referred to as the rotor). The translator is mounted to the stator with a flexure suspension which allows it to translate in the two orthogonal directions within the parallel plane.

The pattern of electrodes on the translator consists of two orthogonal groups of parallel conductive stripes of fixed width, spaced at a constant width. Each group of stripes may be contiguous or may be subdivided into multiple regions distributed over the surface of the translator. Within each group a periodic sequence of voltages is applied to consecutive adjacent stripes. This results in two regions where the spatial potential distribution is a periodic function of the translator stripe pitch in one direction and a constant in the other. A simple arrangement is to alternately connect the stripes to potentials which differ by V volts.

The stator electrodes are also divided into two groups of orthogonal stripes. Each group is subdivided in the same fashion as the corresponding group of translator electrodes and aligned opposite the corresponding region of parallel stripes on the translator. The pattern of stripes on the stator has a pitch which is an integral factor of the pitch of the translator electrodes facing them. The length of the stator stripes exceeds that of the facing translator stripes and they are aligned so that the overlap between the facing stripes will remain equal to the length of the shorter stripe throughout in-plane parallel translation. Therefore, motion in the parallel in-plane direction will not affect the capacitance between the facing stripes; and consequently, the forces in the two directions perpendicular to the stripes will not change. The decoupling of the forces produced by the two orthogonal groups of stripes from orthogonal in-plane translation allows a single rigid element to be translated in two perpendicular directions. This results in a more compact micromotor with higher out-of-plane stiffness and more area available for traction-producing features, when compared with designs requiring nesting or stacking to achieve two-dimensional motion, e.g., two dimensional comb-drives.

The spatial frequency and amplitude of the stator potential functions are the same as their respective translator counterparts; however, the spatial phase of the potential distribution can be shifted electrically by the closed loop controller 60. The spatial period of the stator potential divided by the pitch of the stator electrodes gives the number of stator electrical phases, n. Modulation of the voltages on the n stator electrical phases can be used to shift the spatial phase of the stator potential distribution.

As the spatial phase of the stator potential distribution is shifted from 0 degrees, relative to the translator distribution, to 180 degrees, the in-plane force between the translator and stator will pass through two equilibrium positions. At 0 degrees, the in-plane force is in an unstable equilibrium condition. At this point the out-of-plane force reaches a positive maximum (maximum out-of plane repulsion). At 180 degrees, there is a second equilibrium condition which occurs. The in-plane force is stable at this point and the out-of-plane force is at a negative maximum (maximum attraction).

By the closed loop controller 60 adding a common bias voltage (BV) to each of the stator electrodes when the translator and stator are in the unstable equilibrium position, the repulsion can be reduced to zero, while the in-plane force remains in unstable equilibrium. Note that alternatively these bias voltages can be applied to the translator electrodes with the same effect.

Stabilizing the in-plane force at the unstable equilibrium position is achieved by the closed loop controller 60 shifting the electrical phase of the stator potential distribution in a direction to produce an in-plane force which opposes motion of the translators away from the equilibrium position. The phase of the stator potential distribution can be shifted by an amount equal to the pitch of the stator electrodes just by permuting the voltages applied to the n stator electrical phases with a modulo n shift of magnitude 1, i.e., assign to phase "I" the voltage currently applied to phase "I−1" (or "I+1" to shift in the other direction).

Two equally preferred techniques have been demonstrated for altering the phase by less than the stator pitch. The first technique is to linearly vary the voltage of each of the n stator electrical phases between its present value and the value currently applied to the subsequent (or preceding) electrode phase. The second technique is to time multiplex between the present electrode phase voltage and the voltage of an adjacent electrode phase with a duty-cycle proportional to the phase shift. The period of the time for a multiplex cycle is preferably selected to be far shorter than the mechanical time constants of the micromotor. These techniques will be referred to as linear control and pulse width modulation control and have been demonstrated experimentally.

Position information is very important to the operation of the servo. A technique has been demonstrated for using the drive electrodes of the translator and stator as position sensors for in-plane and out-of-plane relative displacements of the translator and stator, concurrent with operation of the motor, using either pulse-width modulation or linear control. The approach is to superpose an AC excitation on top of the DC excitation supplied to the translator electrodes and, by sensing these signals with the stator electrodes, measure the phase-to-phase capacitance; and hence, infer the displacement. The technique which will be described for measuring the in-plane position has the following characteristics: it does not interfere with the concurrent operation of the motor, it is immune to biases produced by changes in the amplitude of sensor drive signals, it provides both in-phase and quadrature signals for full four quadrant position sensing, and it is unaffected by changes in the translator-stator gap. In addition the same measurements can be processed in a different manner to provide a measurement of the translator-stator gap, which is independent of the relative in-plane position of the translator and stator.

Referring again to FIG. 1, a specific example will be presented to demonstrate the invention. The example illustrates the idea with measurement of one in-plane direction and gap. In this example, the mechanical pitch and width of the electrodes on the translator 14 and the stator 12 are the same. The spatial period of the potential distribution is equal to four times the pitch. The stator then will have four electrical phases (stator $\Phi A$, $\Phi B$, $\Phi C$ and $\Phi D$). Note that the translator does not need to be 4-phase. In this example, consecutive pairs of translator electrodes are connected to two alternate voltage sources thereby requiring only two translator electrical phases (rotor $\Phi A$ and $\Phi B$) to generate a potential distribution with a period equal to four times the pitch.

A small AC voltage is added to the DC excitation applied to each of the two translator phases. The frequency of these small dither signals 62 and 72 is different for each of the phases. The frequency is preferably well above any natural frequency of the micromotor and the bandwidth of the servo. These signals will have a negligible affect on the electrostatic forces between the translator 14 and the stator 12 for two reasons. First, the amplitude of the dither signals can be very small relative to the DC excitation. Secondly, because the dither frequency is well beyond the bandwidth of the motor, the signal will add a small DC bias force proportional to the square of the dither amplitude. If the dither amplitude is constant, then this contribution can be considered as part of the DC translator excitation.

The four stator phases have voltages applied to them based on the control law's prediction of the spatial phase of the stator potential distribution required to maintain force equilibrium. The dither signals from the two translator phases are coupled to the four stator phases by capacitances which depend on the gap and in-plane position. By connecting each stator drive to its respective stator phase through a simple RC low-pass network (40, 42, 44 and 46) with a cutoff frequency well beyond the bandwidth of the servo, the required drive voltages can be applied to the phases by the closed loop controller 60 while the dither signals can be detected through the network's capacitor. Each of the four stator phases will receive signals at both dither frequencies. The amplitudes of these eight signals can be independently resolved by simple AM demodulators (50, 52, 54 and 56) (i.e., band-pass filter, then rectify, then low-pass filter).

These amplitudes will depend on four position-dependent capacitances: stator phase A to rotor phase A, stator phase A to rotor phase B, stator phase B to rotor phase A, and stator phase B to rotor phase B, where the labels for the phases refer to FIG. 1. The remaining four combinations are equal to the preceding capacitances by symmetry, e.g., stator phase C to rotor phase B equals stator phase A to rotor phase A. The use of two different dither frequencies permits separation of the contributions from the two capacitances at each stator electrical phase. The difference of the two dither frequency amplitudes at stator phase A, less the difference of the two dither frequency amplitudes at stator phase C (taken in the same order), gives a quantity which varies periodically with the translator-stator in-plane position and crosses zero when the stator phase A is centered between the translator phases A and B. Similarly, the difference between the dither frequency amplitudes at stator phase B less the difference of the dither frequency amplitudes at stator phase D results in a spatially periodic quantity which crosses zero when stator phase B is centered between the two translator phases. These two quantities are 90 spatial degrees separated in phase and will be referred to as E_i and E_q respectively.

The importance of having two signals in quadrature when using periodic signals for position sensing is well known. When properly combined, quadrature signals can be used to provide an unambiguous position signal with good linearity throughout 360 degrees of travel.

The quantities E_i and E_q also depend on the translator-stator gap. They are approximately proportional to the inverse square of the translator-stator gap. This dependency on the gap can be removed by normalizing E_i and E_q with the square root of the sum of the squares of E_i and E_q. This normalization calculates the gap dependent amplitude of E_i and E_q at any translational position from their instantaneous values. This is only strictly true for sinusoids in quadrature. A second advantage of this normalization is that it removes any dependence of the position error signals on the amplitude of the drive dither sinusoids because their amplitude also scales the normalization factor. We have successfully conducted experiments which demonstrate the invariance of position error signals calculated in this manner under changes in translator-stator gap and dither drive signal amplitudes.

The translator-stator gap can be measured from the same fundamental measurements. The sum of any pair of detected dither signal amplitudes, whose translational dependence is of opposite phase, will provide a gap measurement which is independent of in-plane position. All eight measurements can be summed to reduce the noise of the measurement. Because this measurement is essentially a gap measurement of a parallel plate capacitor, it has an inverse square dependence on the gap. If the signal is not normalized, it will vary with changes in the amplitude of the dither drive signals. The signal will also contain an offset due to couplings, which are independent of the relative position of the translator and stator.

It is important to note that, although this quantity is simpler to calculate than the root of the sum of the squares of E_i and E_q, it is not suitable as a normalization factor for E_i and E_q. This is because each of the detected dither amplitudes is partially due to couplings, which do not change with gap or translational position. These stationary couplings are removed as common mode signals when taking the differences in the calculation of E_i and E_q; and hence, are not present in the root of the sum of their squares.

Although illustrative embodiments of the invention have been described in detail, it is to be understood that the invention is not limited to the precise embodiments described, and that various modifications may be practiced within the scope of the invention defined by the appended claims.

What is claimed is:

1. An electrostatic actuator comprising:
  a rotor having a plurality of rotor electrodes, a first DC rotor signal combined with a first AC dither signal provided to a first subset of the rotor electrodes and a second DC rotor signal combined with a second AC dither signal provided to a second subset of the rotor electrodes;
  a stator having a plurality of stator electrodes;
  a plurality of crossover networks coupled to the stator electrodes, with each crossover network of the plurality of crossover networks coupled to a different one of the stator electrodes;
  a plurality of demodulators, coupled to the plurality of crossover networks, with each of the plurality of demodulators coupled to a different one of the crossover networks; and
  a closed loop controller coupled to each of the demodulators and each of the crossover networks wherein said closed loop controller establishes an alternating variable voltage pattern on the array of drive electrodes to laterally move the rotor, determines the position of the rotor from the demodulated first and second dither signals sensed on the plurality of stator electrodes, and provides a common bias voltage to the drive electrodes when the rotor is in an unstable position to reduce the out of plane forces to zero.

2. The electrostatic actuator of claim 1, in which:
  the plurality of rotor electrodes is a first array of rotor electrodes;
  the array of stator electrodes is a first array of stator electrodes;
  the rotor additionally includes a second array of rotor electrodes disposed parallel to the first array of rotor electrodes;
  the stator additionally includes a second array of stator electrodes disposed parallel to the first array of stator electrodes; and
  the first array of rotor and stator electrodes and the second array of rotor and stator electrodes collectively operate to move the one of the first member and the second member relative to the other.

3. The electrostatic actuator of claim 1, comprising:
  a support disposed between the rotor and the stator to support the rotor and the stator adjacent one another, and to permit movement of one of the rotor and the stator relative to the other.

4. The electrostatic actuator of claim 1, in which:
  the first and second dither signals are detected by the plurality of stator electrodes to measure in-plane displacement of the rotor relative to the stator.

\* \* \* \* \*